May 19, 1936.   H. WRIGHT ET AL   2,040,891
AUTOMATIC TIRE GAUGE SWITCH
Filed March 8, 1932
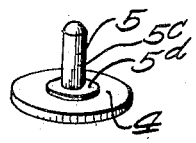
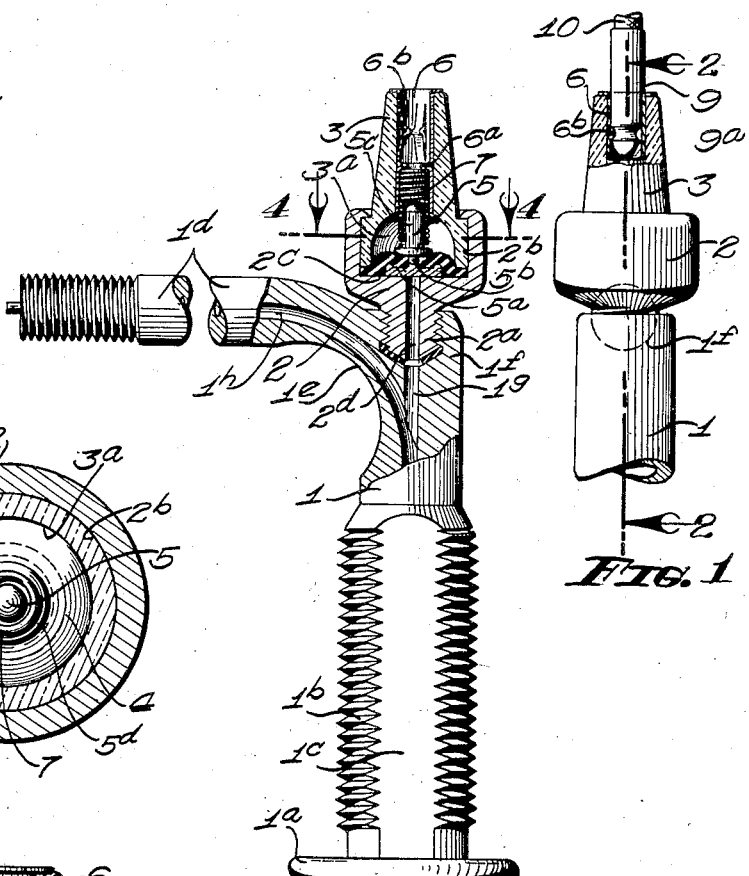
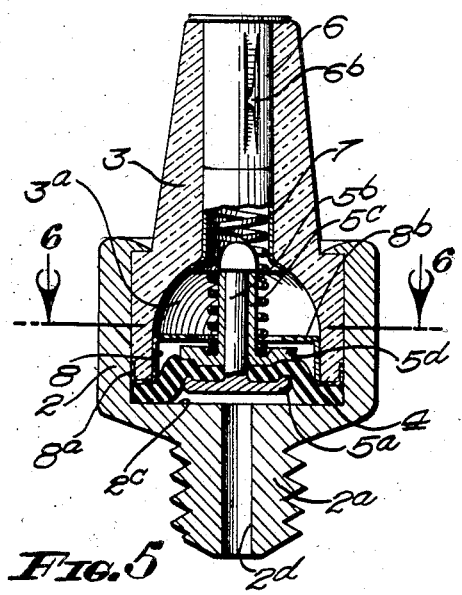
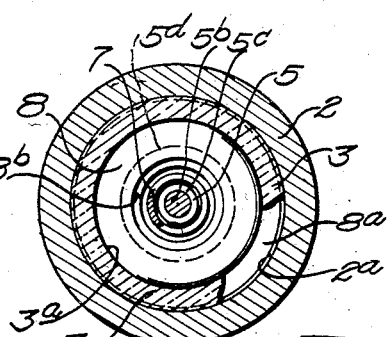
Inventor
HARRY WRIGHT
HUGH HEMPERLY
A.B. Bowman
Attorney Patented May 19, 1936

2,040,891

UNITED STATES PATENT OFFICE 2,040,891

AUTOMATIC TIRE GAUGE SWITCH

Harry Wright, San Diego, Calif., and
Hugh Hemperly, Phoenix, Ariz.

Application March 8, 1932, Serial No. 597,520

2 Claims. (Cl. 200—58)

Our invention relates to automatic tire gauge switches, and the objects of our invention are:

First, to provide a tire gauge with automatic switch which may be mounted upon each wheel of a vehicle;

Second, to provide a gauge switch of this class which may be used upon airplanes as well as automobiles, trucks, or other land vehicles;

Third, to provide a gauge switch of this class which completes an electric circuit when the pressure in the tire drops below a predetermined minimum;

Fourth, to provide a gauge switch of this class which does not interfere with inflation of the tire or with mounting the tire upon the rim;

Fifth, to provide a gauge switch of this class which may be arranged to indicate over-pressure as well as under-pressure;

Sixth, to provide a gauge switch of this class in which the electrical connection therefrom utilizes the retainer washer cage of the wheel hub in order to form a collector ring with which to electrically join the gauge with the fixed portions of the vehicle;

Seventh, to provide a gauge switch of this class which is arranged in a compact, inconspicuous unit, easily removed or secured to the valve stem, and Eighth, to provide on the whole a novelly constructed automatic tire gauge switch which is durable, efficient in its action, and which will not readily deteriorate or get out of order.

With these and other objects in view as will appear hereinafter, our invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Fig. 1 is a partial sectional partial elevational view of our automatic tire gauge switch, with the parts enlarged to facilitate the illustration; Fig. 2 is an enlarged sectional view of the valve stem and gauge unit taken substantially along the line 2—2 of Fig. 1, with parts and portions in elevation to facilitate the illustration; Fig. 3 is an enlarged perspective view of the diaphragm and contact clamp; Fig. 4 is a still further enlarged transverse sectional view through 4—4 of Fig. 2; Fig. 5 is an enlarged sectional view taken longitudinally through a modified form of our gauge unit, and Fig. 6 is an enlarged transverse sectional view thereof through 6—6 of Fig. 5.

Similar characters of reference refer to similar parts and portions throughout the several views of the drawing.

In place of the conventional valve stem there is substituted a special valve stem 1. The portion of the valve stem coacting with the tube is conventional in that it is provided with an enlarged inner end 1a and screw threads 1b interrupted by flattened portions 1c for receiving the clamping member, locking nut, and centering nut. Above the threaded portion 1b the shank of the valve stem is constricted and is bent into a right-angle turn forming a laterally extending portion 1d in the extended end of which is a suitable valve. The inner side of the curve or elbow provided in the stem 1 may be cut away, as indicated by 1e, to facilitate placing the nuts over the valve stem. At the outer side of the elbow there is provided a short upwardly extending boss 1f which is provided with a bore 1g therein intersecting the main bore, designated 1h, of the valve stem.

The outer end of the bore 1g is enlarged and internally threaded so as to receive an externally threaded boss 2a provided at the lower extremity of a gauge unit base member 2. Above the boss member or portion 2a the base member 2 is enlarged radially and forms a cup-shaped portion 2b with a flat floor 2c. The base member is provided with a passage 2d intersecting the floor 2c and registering with the bore 1g.

The enlarged cupped portion 2b of the base member is adapted to receive the lower end of an insulating member 3 which is provided with an enlarged recess 3a at its lower extremity. The base member 2 and insulating member 3 clamps the periphery of a gauge diaphragm 4. Secured in centered relation to the gauge diaphragm 4 is a contact clamp 5 which comprises a lower member arranged with a head portion 5a at the lower side of the gauge diaphragm and a stem portion 5b extending upwardly through the diaphragm and into an upper clamp member 5c. The extended end of the shank or stem 5b is enlarged so as to rivet the two members of the contact clamp 5 together.

The insulating member may be permanently held in place with its lower end in the base member by pressing the upper margin of the cup portion 2b over a shoulder formed in the insulating member 3, as shown best in Figs. 2 and 5. The insulating member 3 is provided with a bore concentric with the recess 3a and arranged to receive a sleeve 6. The sleeve 6 is provided with a suitable constriction 6a intermediate its ends which is adapted to be engaged by one end of a spring 7, the other end of which rests against the top member of the contact clamp 5 so as to yieldably hold the lower floor member or head 5a against the floor 2c of the base member. When the pressure within the tire exceeds a predetermined amount, the diaphragm 4 raises so that the head 5a clears the floor 2c. Inasmuch as the diaphragm 4 is made of rubber or other insulating material, the contact clamp is insulated from the base member 2 and valve stem when it raises from the floor 2c.

It is often desirable to indicate when the pressure exceeds a predetermined amount as well as when the pressure falls below the desired amount. This may be accomplished by providing a contact ring 8, as shown in Figs. 5 and 6. The contact ring 8 includes a radially extending and upturned rim portion 8a at its lower side which fits over the inner end of the insulating member 3 and engages the side walls of the cup portion 2b of the base member 2. The body of the clamp ring extends axially within the recess 3a provided at the lower end of the insulating member then turns inwardly forming an inwardly extending flange 8b overhanging the enlarged end, designated 5c, of the upper clamp member which forms a part of the contact clamp 5. Thus, if the air pressure within the tire exceeds a predetermined amount, the contact clamp 5 engages the contact ring 8 thereby closing a circuit.

The upper portion of the sleeve 6 is provided with inwardly extending clips 6b which are adapted to engage the head portion, designated 9a, of a terminal member 9. The terminal member 9 is connected to a wire 10.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a pressure indicator for vehicle tires, the combination with a means of communication with the interior of a tire tube, of a switch casing having a chamber communicating with said means, a non-conducting diaphragm dividing said chamber, a movable contact carried by said diaphragm, fixed grounding contacts on opposite sides of said movable contact whereby the switch is closed when the air in said tire rises above or falls below a predetermined pressure range.

2. In a pressure indicator for vehicle tires, a cup-shaped switch casing, a conduit means connecting said switch casing with the interior of a vehicle tire, an insulating member fitting within said casing and forming therewith a chamber, an insulating diaphragm clamped between said insulating member and said casing arranged to yield when the pressure within the tire exceeds a predetermined amount, a movable contact carried by said diaphragm, a terminal within said insulating member, yieldable means extending from said terminal to said movable contact, said casing forming a grounding contact for said movable contact when the pressure is below said predetermined amount.

HARRY WRIGHT.
HUGH HEMPERLY.